United States Patent [19]
Boeve et al.

[11] Patent Number: 5,721,436
[45] Date of Patent: Feb. 24, 1998

[54] SCANNING APPARATUS FOR PSL RADIOGRAPHY WITH A SCANNING CARRIAGE AND BELT

[75] Inventors: Gerard Boeve, Edegem; Jan Heyen, Wilrijk, both of Belgium

[73] Assignee: Agfa-Gevaert N.V., Mortsel, Belgium

[21] Appl. No.: 657,539

[22] Filed: Jun. 4, 1996

[30] Foreign Application Priority Data

Jun. 6, 1995 [EP] European Pat. Off. ........... 95201481.9

[51] Int. Cl.⁶ ..................... G01N 23/04; G03B 42/02
[52] U.S. Cl. ............................... 250/589; 250/581
[58] Field of Search ..................... 250/589, 590, 250/581, 588, 584

[56] References Cited

U.S. PATENT DOCUMENTS 5,340,995  8/1994  Verbeke et al. ................. 250/581
5,349,628  9/1994  Taniguruma .

FOREIGN PATENT DOCUMENTS

0276698  8/1988   European Pat. Off. .
0567171  10/1993  European Pat. Off. .
3207328  9/1983   Germany .
1055547  6/1989   Japan .
2-278252 11/1990  Japan ......................... 250/589
4-42222  2/1992   Japan ......................... 250/589

Primary Examiner—Edward J. Glick
Attorney, Agent, or Firm—Brumbaugh, Graves, Donohue & Raymond

[57] ABSTRACT

A scanning apparatus is described with a transport device for conveying a cassette past a scanning and erasing station, which transport device comprises a scanning carriage (31), a carriage carrier (63) on the top surface of the carriage near its leading end, an endless belt (26) which has an upper stretch which runs through a groove in the top surface of the carriage, belt carrier device (60) on said endless belt, a coupling mechanism (64) for coupling the upper stretch of the belt to the carriage, and control unit (86, 78) for controlling the operation of said coupling mechanism.

8 Claims, 12 Drawing Sheets

SCANNING APPARATUS FOR PSL RADIOGRAPHY WITH A SCANNING CARRIAGE AND BELT

BACKGROUND OF THE INVENTION

1. Field of the Invention

The present invention relates to a compact scanning apparatus for scanning a cassette of the type used in photo-stimulable luminescence ("PSL") radiography.

2. Description of the Prior Art

In PSL radiography, a PSL X-ray plate has applied thereto a layer of a photostimulable luminescent material which comprises a phosphor, e.g. a europium-activated barium fluorohalide, and a binder. The phosphor has the characteristic that it can be energised to an excited state by X-rays, and can then be stimulated by visible or infrared light to return to the ground state with the emission of visible light (different in wavelength from the stimulating light). The excited state has a half-life of at least several hours or days in the absence of stimulating light. A PSL plate is potentially re-usable many times. The technique is described in an article by Sonoda et al. in Radiology, Vol.148 (September 1983), pp.833 to 838, and it offers the potential advantages of better image resolution at lower X-ray dosages for the patient.

Cassettes in a known PSL system are conventional X-ray cassettes, comprising a base and a lid hinged thereto, both parts having on the inside a soft lining for protection of the enclosed PSL sheet. Systems using such cassettes are bulky because opening a cassette must occur over a certain minimum angle to get sufficient access to the interior for a suction cup to catch the film and remove it from the cassette. In addition, manipulation of the locks of the cassette, of the hinging cap, and delicate gripping and transport of the exposed PSL sheet require a considerable amount of precise, mechanical gripping means and co-operating servo-motors making control of the system complicate and requiring additional space. A system of the kind described is disclosed in EP-A-0 309 874.

An improved PSL cassette is disclosed in EP-A1-0 567 175, corresponding to U.S. application Ser. No. 08/039,993, now abandoned. This cassette comprises a flat rigid base plate and a cap for the base which is releasably secured to the base plate so as to lighttightly cover a layer of PSL material applied to the inside face of the base plate. Because the PSL material is held on a flat and substantially rigid plate it can readily be transported through a scanner without any contact between parts of the scanner transport system and the PSL layer.

A suitable scanning apparatus for scanning such improved cassette is disclosed in EP-A1-0 567 171 which deals with a scanning apparatus comprising a receiving station for the receipt of a cassette into the apparatus, transport means for conveying the cassette to a separating station which includes means for separating the base plate and its cap from each other, means for transporting the base plate along a path leading through a scanning station where the plate may be scanned and, via an erasing station, an assembly station where the plate and its caps are re-assembled, the apparatus being arranged in such a way that the cap and the base plate remain in substantially parallel relationship during their separation. The disclosed apparatus has the disadvantage that it occupies rather much space.

DESCRIPTION OF THE INVENTION

Object of the invention

It is the object of the present invention to provide a scanning apparatus which can be loaded with a stack of image-wise exposed PSL cassettes, which is compact and which can have table-top dimensions.

More in particular, the invention provides a scanning apparatus with improved cassette transport means for conveying a cassette past the scanning and erasing station of such apparatus.

Statement of the invention

In accordance with the present invention, a scanning apparatus with a scanning and erasing station for scanning and erasing a cassette of the type used in photo-stimulable luminescence ("PSL") radiography, which apparatus comprises a receiving station for the receipt of a stack of such cassettes and for removing the cassettes one by one from their stack and locating them through an entry port of the apparatus on transport means conveying them past said scanning and erasing station, is characterised in that said transport means comprises:

a scanning carriage which has a rest position in which a cassette which has been removed from the stack is received on the carriage, carriage carrier means on the top surface of the carriage near its leading end, an endless belt which has an upper stretch which runs through a corresponding groove in the top surface of the carriage, which groove runs parallel to the scanning direction, belt carrier means provided on said endless belt, coupling means for coupling the upper stretch of the belt to the carriage, and control means for controlling the operation of said coupling means, and driving means for reciprocally driving the belt so that in the forward drive of the belt a cassette which has been located on the carriage is pushed forward by contact of its rear edge with the belt carrier means and is slid forward over the carriage until its leading edge is abutting against the carriage carrier means, and that up from that moment continued rotation of the belt advances the carriage through the intermediary of the cassette, thereby to convey said cassette past said scanning and erasing station, and that in the rearward drive of the belt the coupling of the belt to the carriage causes the carriage to move backwardly.

Suitable embodiments of the invention are as follows.

The control means is arranged for coupling said belt with said carriage after said cassette has been gripped between said belt and said carriage carrier means during the forward drive of the belt.

The coupling means comprises two co-operating jaws provided at the leading end of the scanning carriage, one jaw being fixed to the carriage and the other one being movable towards and away from said first jaw, and spring means urging both jaws together thereby clamping said belt passing between them.

The fixed jaw is fitted to a bracket mounted in front of the carriage and extends transversely over the belt running over the carriage. Said movable jaw is located below said fixed jaw and is spring-biased thereto.

The control means comprises a ferromagnetic yoke which becomes attracted by a permanent magnet.

The belt has other carrier means for engaging the leading end of the cassette during the returning movement of the belt after the coupling between belt and carriage has been broken and the carriage has come to rest, thereby enabling the belt to slide the cassette over the carriage and remove it from the apparatus.

BRIEF DESCRIPTION OF THE DRAWINGS

The invention is described hereinafter by way of example with reference to the accompanying drawings wherein.

DETAILED DESCRIPTION OF THE INVENTION

Figure 1:
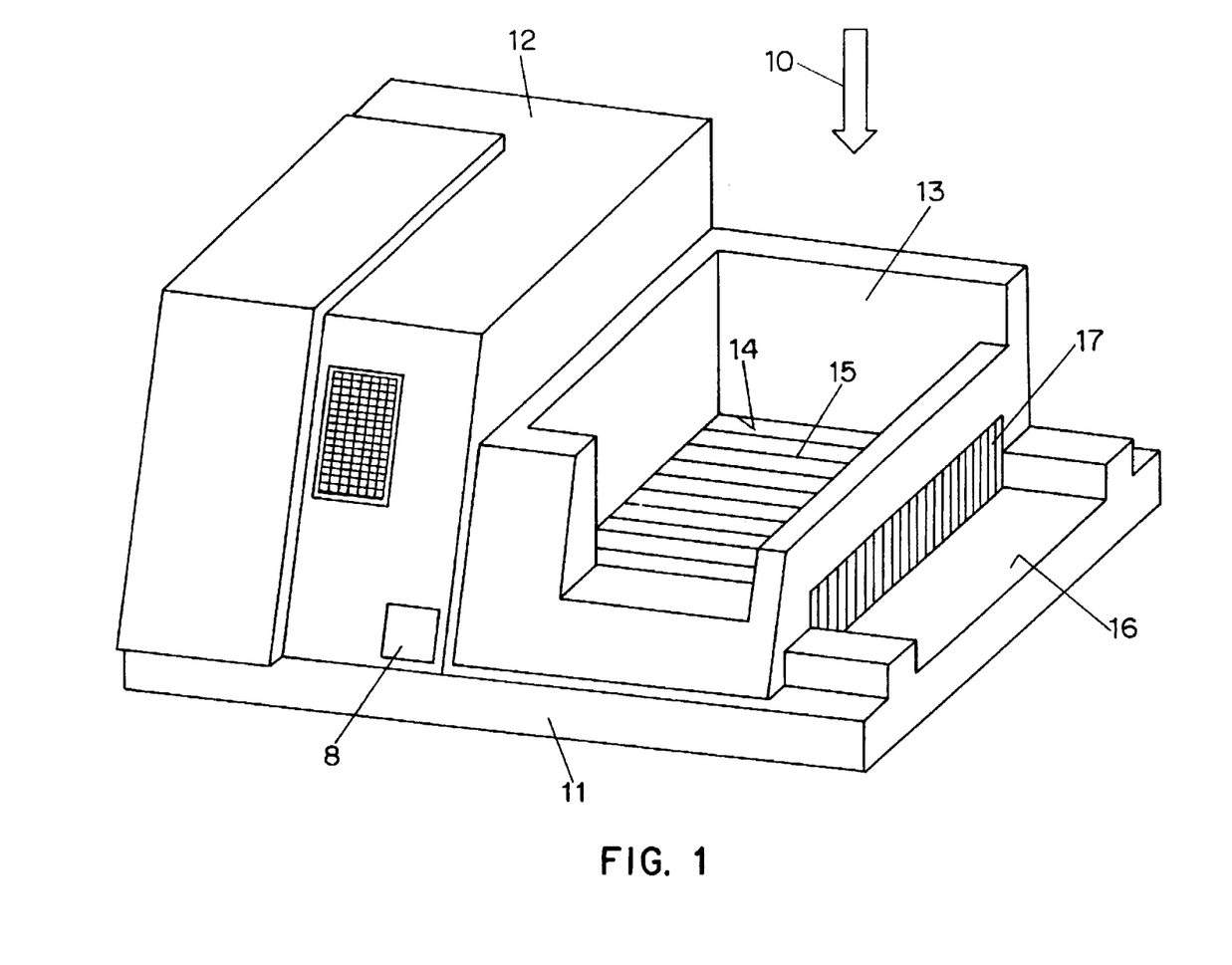
FIG. 1 is a perspective view of one embodiment of a scanning apparatus according to the present invention.

One embodiment of a scanning apparatus in accordance with the present invention is shown in FIG. 1. The apparatus 10 generally comprises a housing 12 mounted on a base 11, and has a cassette receiving station 13 for receipt of a stack of image-wise exposed cassettes. The bottom of this station is provided with a rectangular opening 14 forming the cassette entry port of the apparatus. A lighttight roller shutter 15 closes this port. The base of the apparatus has on its right-hand side a platform 16 for receipt of a processed cassette and also for introducing a cassette in the apparatus which should occasionally by-pass the cassettes stacked in station 13. The inlet port of this platform is closed by a lighttight curtain 17 or the like. Control panel 8 comprises the usual control provisions for operation of the apparatus.

Figure 2:
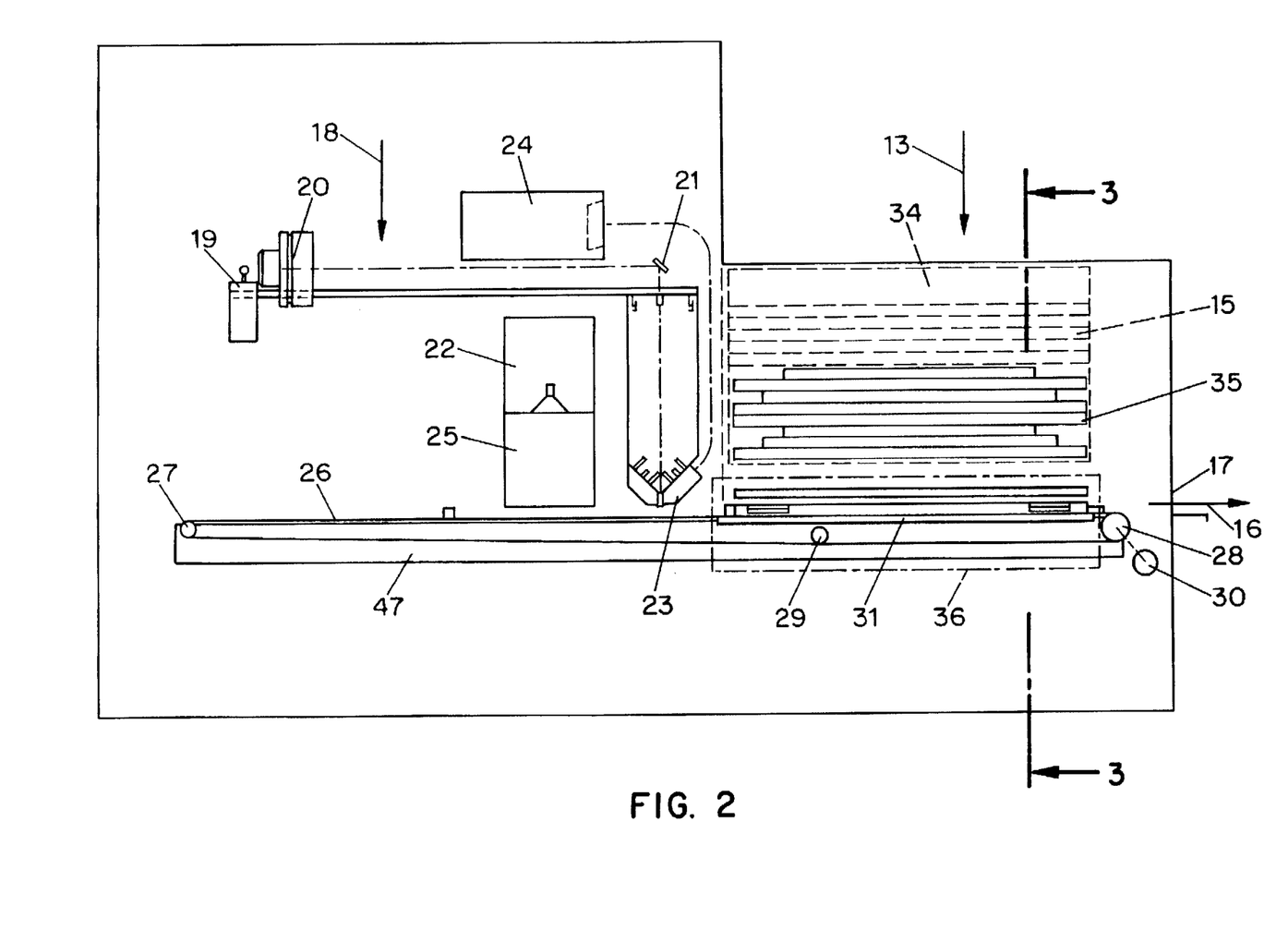
FIG. 2 is a diagrammatic longitudinal sectional view of the scanning apparatus according to FIG. 1.

FIG. 2 is a diagrammatic longitudinal sectional view of the apparatus according to FIG. 1 showing the following elements:

a scanning unit 18 comprising a galvanometer mirror 19 for deflecting the radiation beam of a stimulating rays applying means (not shown), e.g. a helium-neon laser source, a focusing device 20, a plane reflection mirror 21, a light guide 23 which receives light emitted by a phosphor layer being scanned and a photomultiplier 24 receiving light at the output end of the light guide and producing an electrical signal proportional to the light intensity falling thereon;

an erasing unit 25 comprising an erasing light source 22 such as a fluorescent lamp, a tungsten lamp or the like for erasing any residual image in the phosphor layer to enable subsequent re-use thereof by exposure to erasing radiation;

an endless belt 26 guided over pulleys 27, 28 and 29, pulley 27 being driveable to and fro by a motor 30, belt 26 being suitably a flat rubber belt or the like;

a scanning carriage 31 arranged for being coupled to the endless belt, and for moving a cassette past the scanning and erasing unit;

a roller shutter 15 shown in dashed lines, rolled on a roll 34 for closing the entry port of the apparatus and supporting a stack 35 of cassettes to be scanned; and a cassette transfer station shown by rectangle 36 in dashed lines and comprising a mechanism for taking the cassettes away from the stack one by one.

Figure 3A:
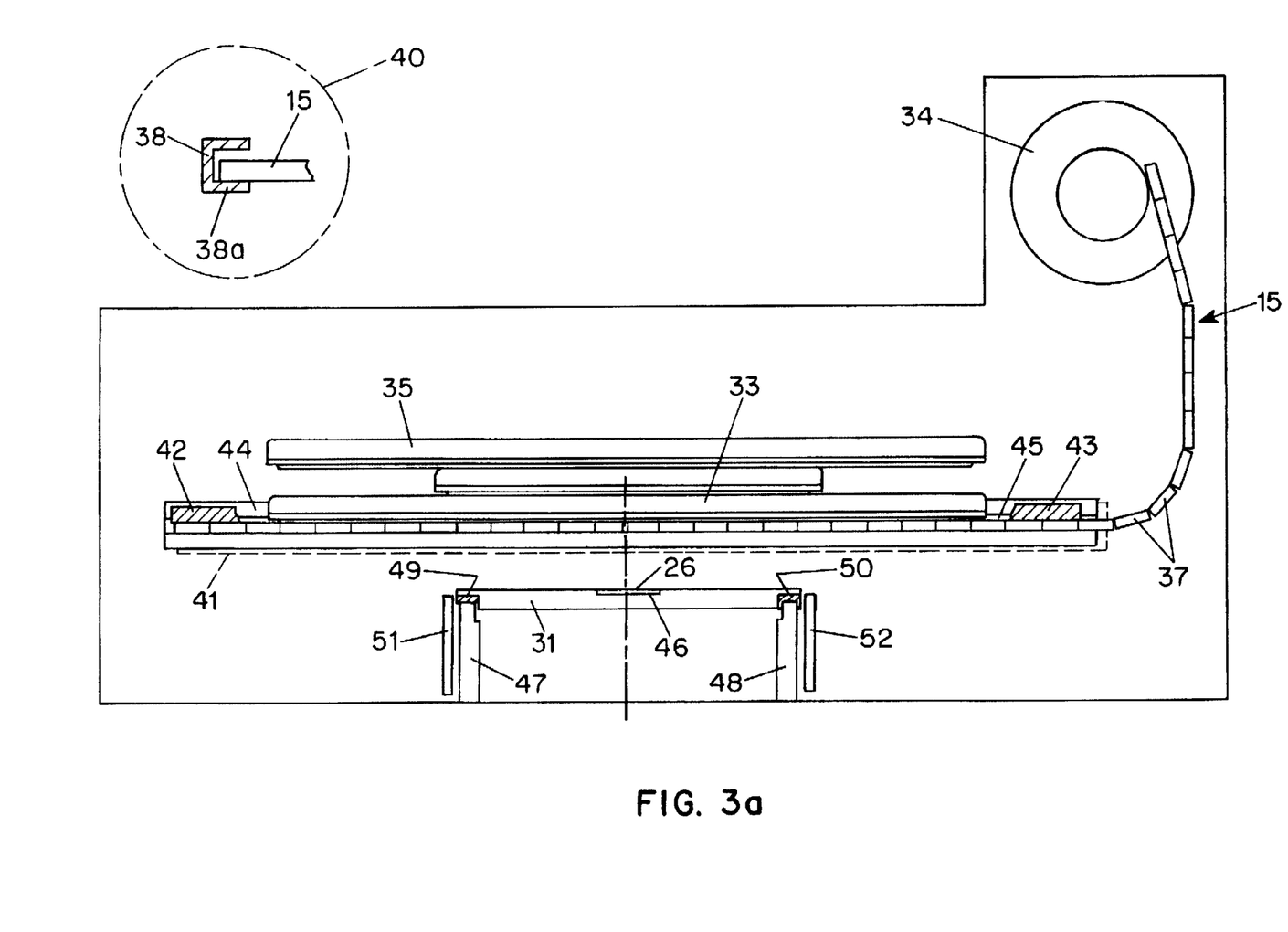
FIG. 3a is a diagrammatic transverse sectional view on line 3—3 of FIG. 2 showing the roller shutter supporting the stack of cassettes and closing the entry opening of the apparatus.

FIG. 3a is a diagrammatic transverse sectional view on line 3—3 of FIG. 2 showing the roller shutter 15 supporting the stack 35 of cassettes and closing the entry opening of the apparatus. The shutter comprises a plurality of rigid slats 37 interconnected by hinges in the form of strips of flexible material allowing the shutter to become unrolled from roll 34 into a horizontal plane for providing support for the cassettes. The horizontal position of the shutter is controlled by two U-shaped guides, such as the guide 38 shown, which guide the corresponding lateral ends of the slats.

Right above the top surface of the closed shutter there are provided two gripper bars 42 and 43 that are interconnected by means, known in the art, to move from a completely open position up to a position in which they catch the undermost cassette 33 of the stack of cassettes, by their ridges 44, 45 engaging a peripheral bottom recess of the cassette. The bars can move symmetrically so that they also have a centering effect on the position of the cassette. It should be understood that an operator can put the different cassette sizes intermixed on the closed shutter, and that also he need not worry about the exact lateral or longitudinal position of a cassette in receiving station 13. The lateral positioning of a cassette occurs as described hereinbefore. The longitudinal positioning thereof will be described later.

Insert 40 on FIG. 3a shows a transverse sectional view of U-shaped guide 38, shutter 15 resting on the lower leg 38a thereof under the weight of cassettes lying on the shutter. The two guides are not mounted stationarily but, on the contrary, are slightly downwardly displaceable. Such downward displacement can occur by any means known in the art, such as small joining arms joining the guides onto stationary bars and thus allowing limited upward and downward swinging of the guides, by pin and oblique slot interconnections with stationary bars causing a downward or upward movement of the guides as they are slightly longitudinally displaced, etc. The downward position of the guides is shown in dashed lines 41, and the purpose thereof will be described later.

Figure 3B:
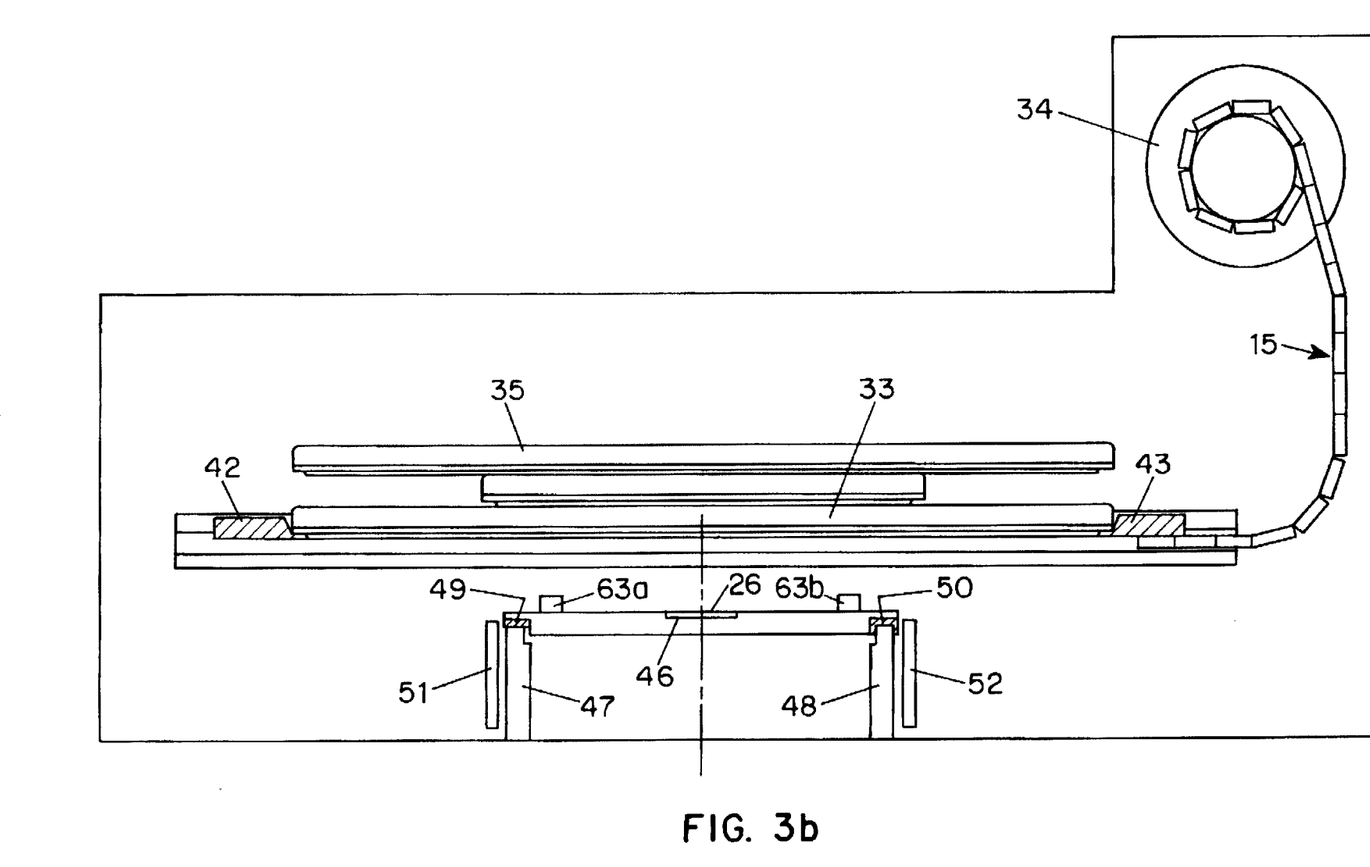
FIG. 3b is a diagrammatic transverse sectional view on line 3—3 of FIG. 2 showing the gripping of the bottom cassette of the stack and the opened shutter.

FIG. 3b is a view on line 3—3 of FIG. 2 showing roller shutter 15 in its opened position, the stack of cassettes being supported by closed grippers 42, 43 engaging bottom cassette 33 of stack 35.

FIGS. 3a and 3b also show scanning carriage 31. The top of the carriage has a rectangular groove 46 extending over the length of the carriage and running parallel to its direction of movement and having a depth such that flat belt 26 lies approximately flush with the top surface of the carriage. The carriage is supported by two laterally spaced horizontal bars 47, 48 constituting likewise the frame of the cam mechanism with cams 51, 52 which will be described hereinafter. Friction bearings 49, 50 guide the carriage on the bars.

Figure 4:
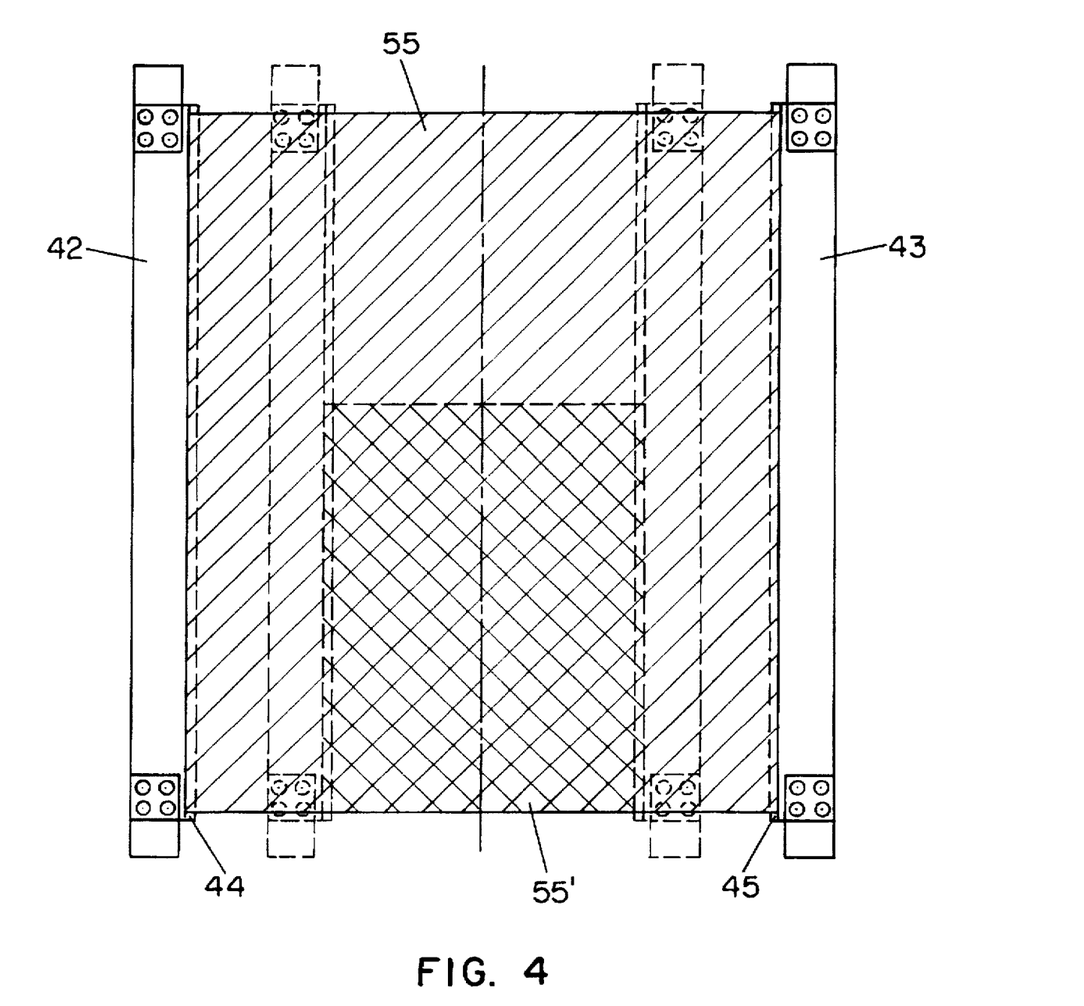
FIG. 4 is a plan view of the entry port of the apparatus.

FIG. 4 is a diagrammatic plan view of the entry port of the apparatus. Grippers 42 and 43 have been shown in drawn lines, corresponding to the largest cassette format shown in hatched lines 55, and in dashed lines, corresponding to the smallest cassette format shown in hatched lines 55'.

Figure 5A:
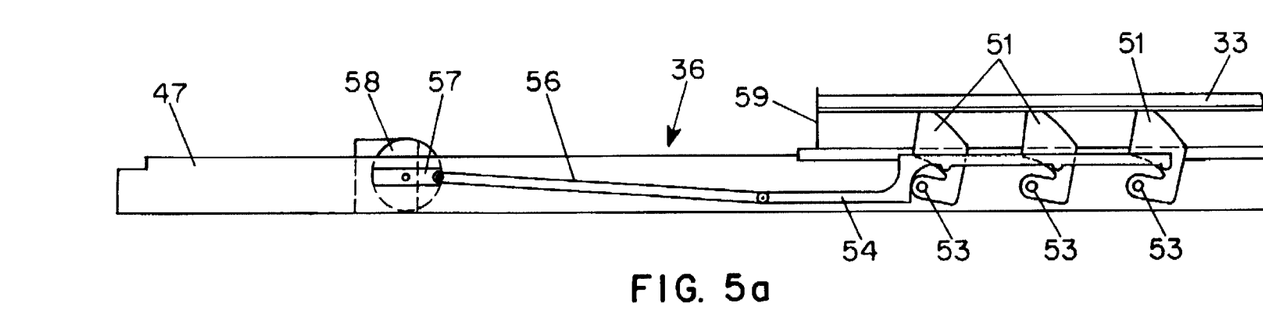
FIG. 5a is a detail view of a cam mechanism in its raised position for supporting a bottom cassette.
Figure 5B:
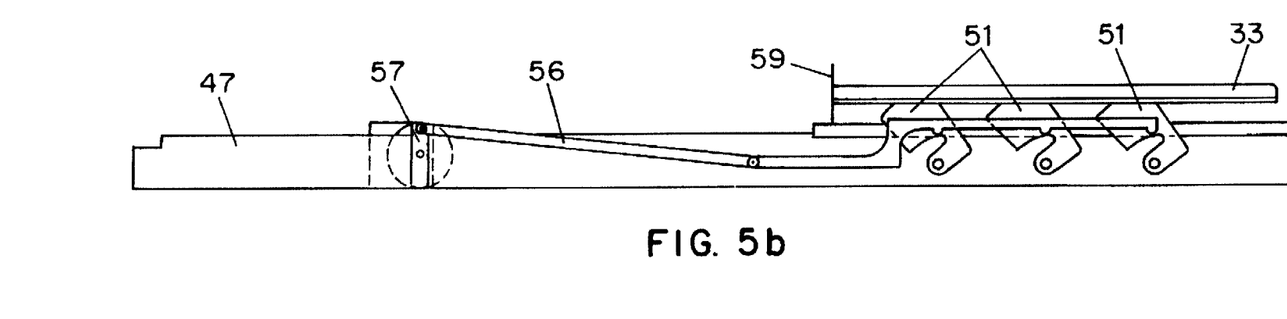
FIG. 5b is a detail view of the cam mechanism of FIG. 5a in an intermediate position.
Figure 5C:
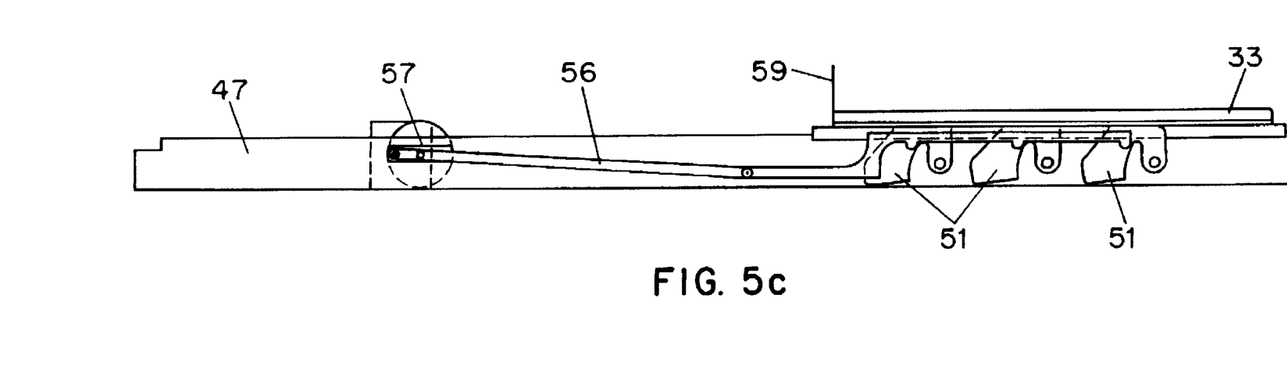
FIG. 5c is a detail view of the cam mechanism of FIG. 5a in its lowered position.

FIGS. 5a to 5c are diagrammatic views of different positions of the cam mechanism shown in dashed lines 36 in FIG. 2 which constitutes a vertical transfer support means for taking over the support of bottom cassette 33 from lateral grippers 42, 43, and for first lowering said cassette over a distance equal to the height of the cassette so that the shutter can be closed and a next cassette be gripped and held by the lateral grippers, and for then further lowering said bottom cassette until it becomes disposed on scanning carriage 31.

FIG. 5a shows the cams in their raised position. Each of bars 47, 48 comprises three cams 51 pivotable on pivots 53. The cams are interlinked by an arm 54 which on its turn is coupled through interconnecting rod 56 with crank 57 driven by motor 58.

Stop 59 is a vertical plate being part of the cover of the apparatus and limiting the forward shift of a cassette as the cams are pivoted anti-clockwise to lower a cassette.

FIG. 5b shows cams 51 in their intermediate position in which a cassette is lowered over a distance equalling the thickness of the cassette, and FIG. 5c shows the cams in their lowest position in which a cassette is disposed on carriage 31.

FIGS. 6a to 6e are diagrammatic longitudinal sectional views through belt 26 and carriage 31 showing different operational positions of both members. Belt 26 has two carriers 60 and 62 fitted in distal relationship onto its outside surface. Scanning carriage 31 has a carrier means 63 near its leading edge.

Figure 6A:
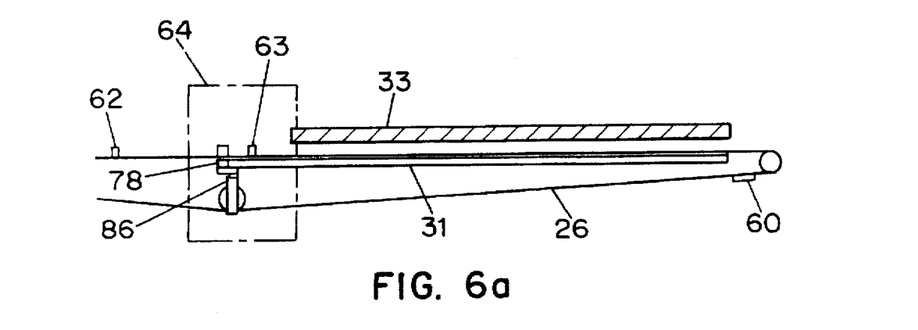
FIG. 6a is a diagrammatic view of the cassette transport mechanism in its rest position.

Carrier 60 can have the shape of a rectangular bar the length of which is larger than the width of the belt so that it can properly angularly orient a cassette by abutting against the trailing end thereof.

Carrier 62 is formed by two laterally spaced pins disposed near the edges of the belt so that it can pass through the coupling mechanism to be described hereinafter.

Carrier means 63 is likewise formed by two laterally spaced pins 63a, 63b provided in the top surface of the carriage, in front of belt coupling mechanism 64. This mechanism is located generally within rectangle 64 shown in dot-and-dash lines and allows the carriage to become firmly coupled to the belt. This mechanism is shown in detail in FIGS. 7a, 7b, 8a and 8b.

Figure 7A:
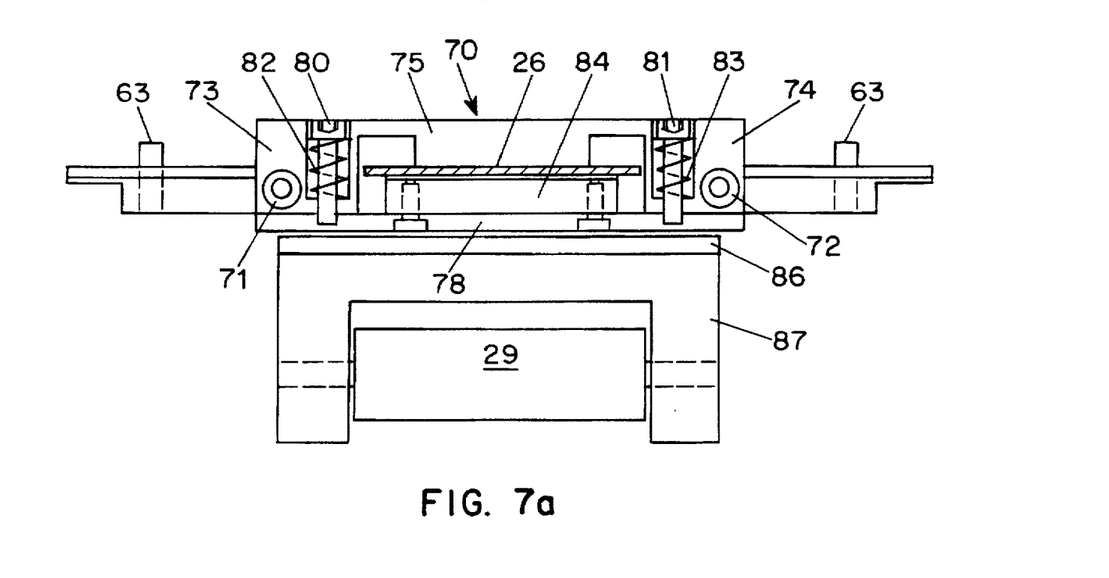
FIG. 7a is a front view of the belt coupling mechanism in the closed position.
Figure 7B:
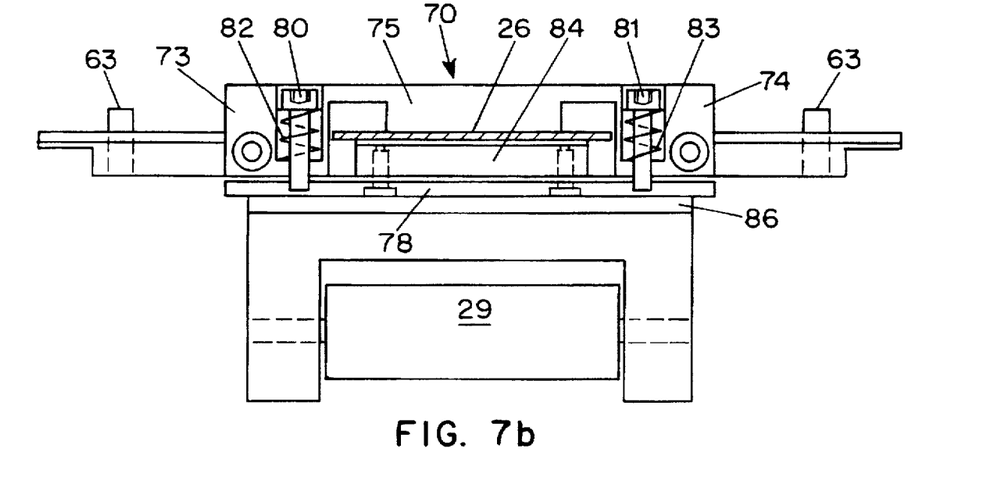
FIG. 7b is a front view of the belt coupling mechanism in the open position.

Referring to FIGS. 7a and 7b which are front views of the belt coupling mechanism 64, a bracket 70 is mounted on the front side of scanning carriage 31 by means of bolts 71, 72 passing through outer legs 73, 74 of the bracket. Central leg 75 forms the upper jaw of the coupling mechanism and has a flat clamping surface 76, see FIG. 8a. A yoke 78 is movably connected to the bracket by means of two bolts 80, 81 passing through corresponding bores in legs 73 and 74 and biased towards the bracket by compression springs 82, 83 seated in bores of legs and pushing on the heads of the bolts which are freely movable within the bore. A jaw 84 mounted on yoke 78 has a knurled top surface 85, and urges belt 26 against clamping surface 76 of leg 75 in the closed position of the mechanism (see FIGS. 7a and 8a). Yoke 78 is ferromagnetic and will be magnetically attracted (see FIGS. 7b and 8b) by permanent magnet 86 fitted on top of bracket 87 as yoke 78 passes over the magnet during displacement of the carriage. Bracket 87 is mounted on the bottom wall of the apparatus and roller 29 is rotatably journaled within the bracket.

Figure 8A:
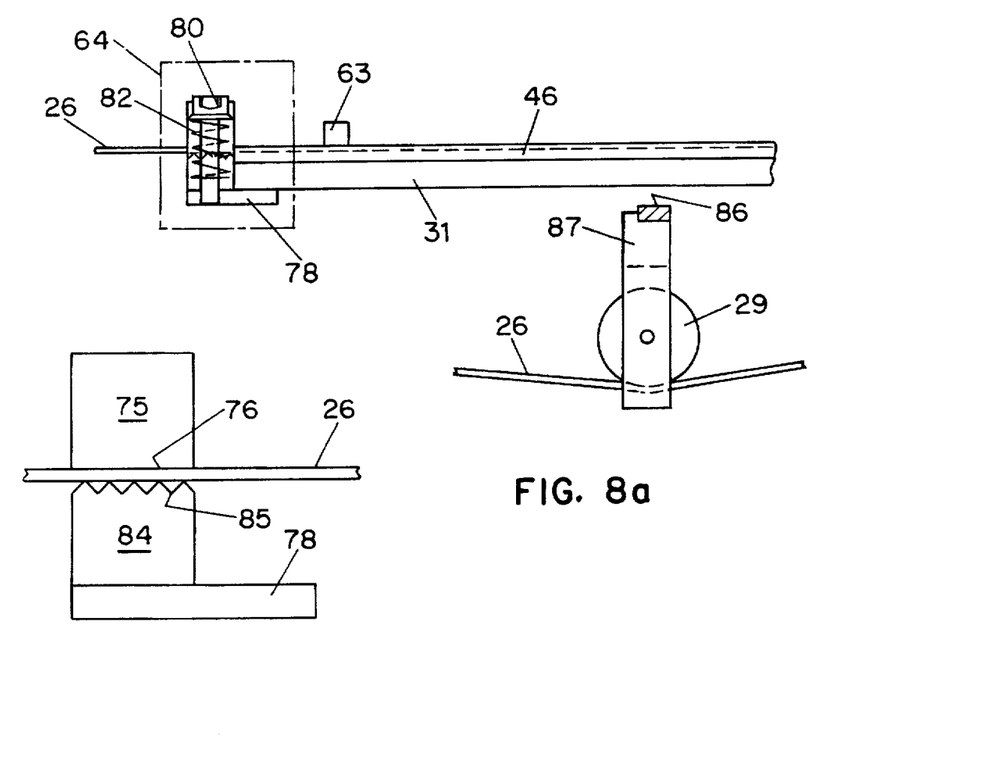
FIG. 8a is a diagrammatic lateral view of the belt coupling mechanism in its closed position.
Figure 8B:
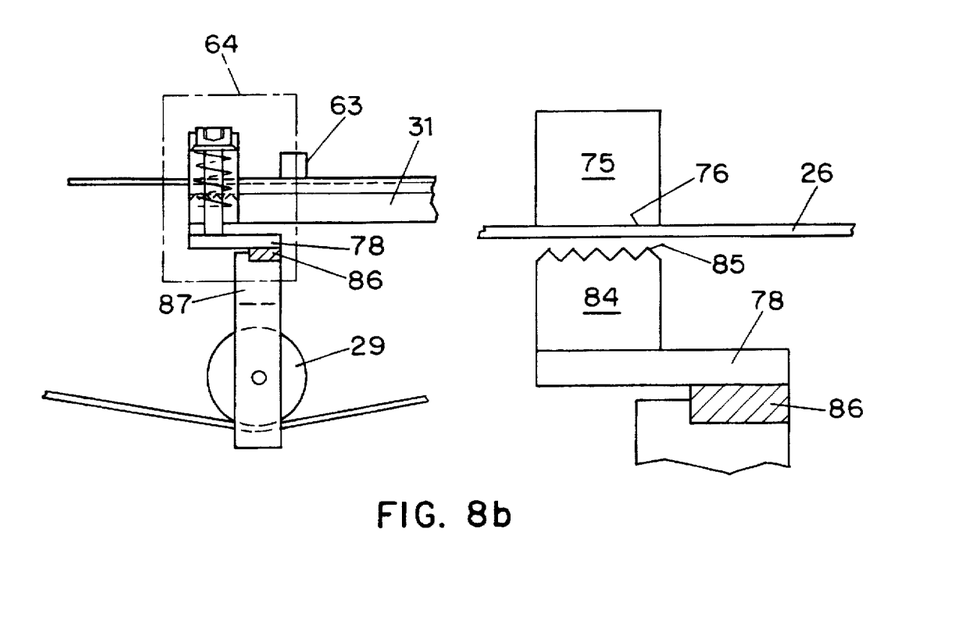
FIG. 8b is a diagrammatic lateral view of this mechanism in its open position.

FIGS. 8a and 8b are diagrammatic side views of the coupling mechanism 64. FIG. 8a shows yoke 78 in a position remote of magnet 86 whereby the clamping jaws remain closed, whereas FIG. 8b shows a coinciding position in which magnet 86 attracts yoke 78, thereby opening the clamp as shown by knurled top surface 85 taking a position remote from belt 26, as distinct from FIG. 8a wherein 85 engages the belt.

The two jaw positions have been separately shown on an enlarged scale in both figures.

Figure 9A:
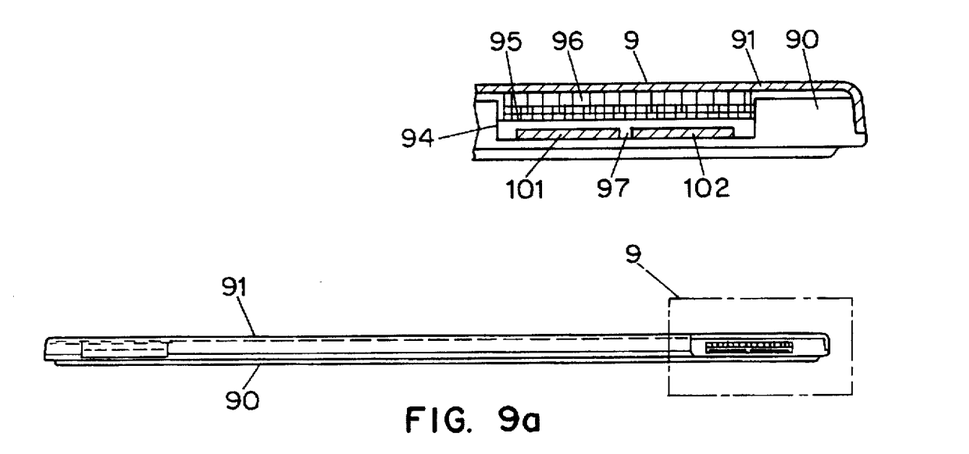
FIG. 9a is a side view, and FIG. 9b a top view of one embodiment of a cassette for use in the scanning apparatus according to FIGS. 1 to 8b, and FIGS. 10a to 10f are diagrammatic views showing distinct phases of the removal of a cassette from a stack of cassettes preparatory to its loading on the scanning carriage.
Figure 9B:
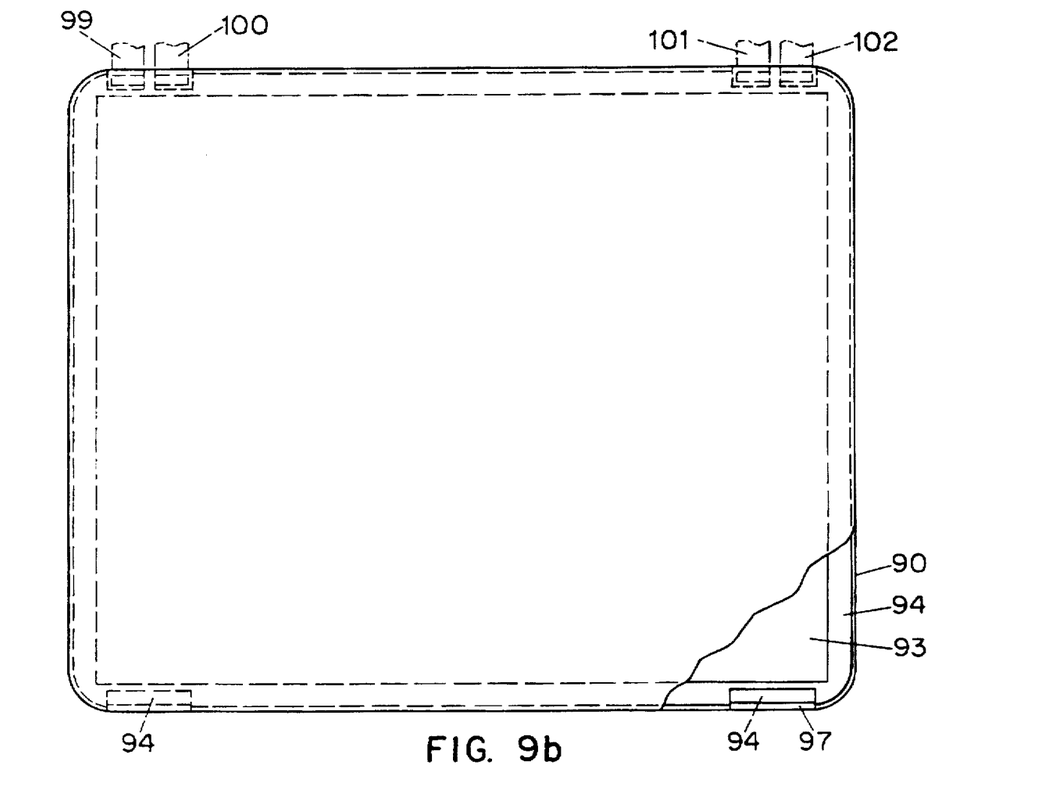

FIGS. 9a and 9b show one embodiment of a PSL cassette which is suited for use in the apparatus described hereinbefore. Section 9 is an enlarged detail of FIG. 9a. The main feature of this cassette is that its cover is completely removable from the base thereby exposing a PSL layer applied on top of its base. Referring to the drawings, 90 is a cassette base and 91 a lighttight cover for it. The base, see the cut-away portion in FIG. 9b, comprises a rigid bottom plate 92 onto which there is provided a PSL layer 93. The PSL material may be directly coated on the base but suitably is coated on a flexible support such as a polyethylene terephthalate sheet which then is adhered to the base. The base has four rectangular recesses 94 into which one part 95 of interlocking patches, e.g. patches sold under the trade mark Dual Lock, manufactured by 3M, are fitted. The co-operating interlocking patches 96 are fitted on corresponding places of cover 91. Opening of the cassette may occur by means of pairs of fingers in the form of flat leaves or the like engaging grooves of the recesses 94 accessible on the outside of the cassette. One such groove is shown as 97 in FIG. 9b. Two pairs of fingers 99, 100 and 101, 102 are shown in FIG. 9a. The inner fingers 100, 101 are fitted to one frame, the outer fingers 99, 102 are fitted to another frame (not shown) that can move upwardly. As the outer fingers, four in all, lift the cover, the inner fingers keep the cassette base in its place on the scanning carriage. The opening mechanism as such makes no part of the invention and is therefore not further described in detail. More details about suitable cassettes and their locking mechanism can be found in our co-pending U.S. application Ser. No. 08/039,993.

The operation of the above-described apparatus will be explained hereinafter with reference to FIGS. 1, 5a to 5c, 6a to 6e, and 10a to 10f.

Figure 10A:
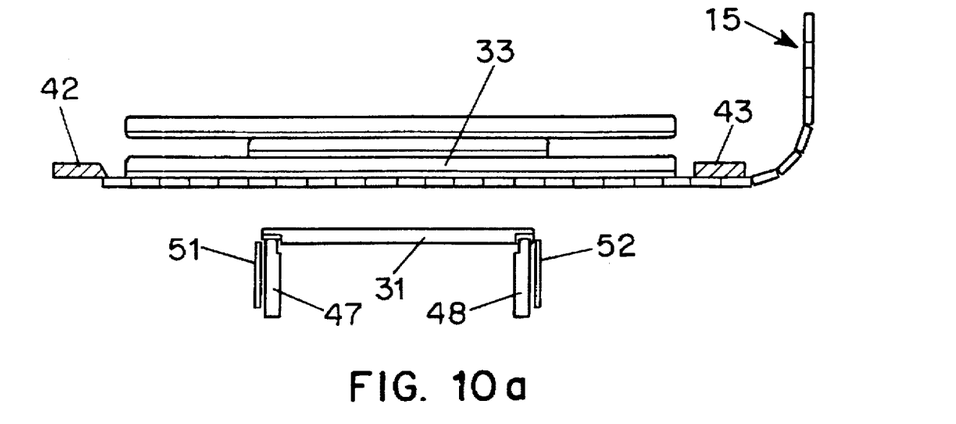

Referring to FIGS. 1 and 10a, the operator has put a stack of image-wise exposed cassettes on closed roller shutter 15. Exact positioning of this stack, more in particular of the undermost cassette is uncritical since grippers 42, 43 are in their fully open position. Cams 51, 52 are in their lowermost position.

Figure 10B:
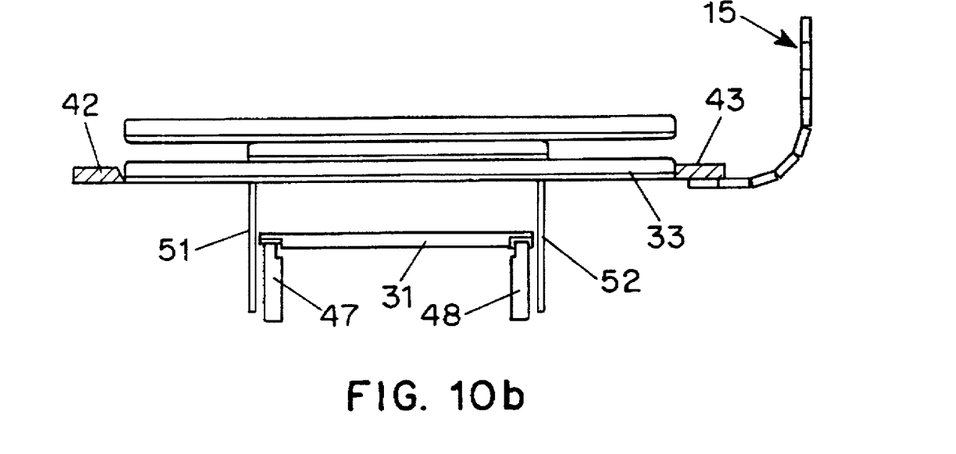

FIG. 10b shows the start of a scanning cycle. Grippers 42, 43 are approached towards each other thereby gripping the undermost cassette 33 as shown in detail in FIG. 3b and supporting in that way the complete stack of cassettes. Roller shutter 15 is opened and cam mechanism 36 is operated to rotate cams 51, 52 into their raised position as shown in FIG. 5a. It is clear that opening of the shutter would cause the slats thereof to rub against the bottom surface of cassette 33. For that reason, and as described already above, guides 38 for the shutter (see FIG. 3a) are preferably slightly downwardly displaceable, e.g. over a distance between 2 and 5 mm, so that up from the first opening motion of the shutter frictional contact of the latter with the cassette is avoided.

Figure 10C:
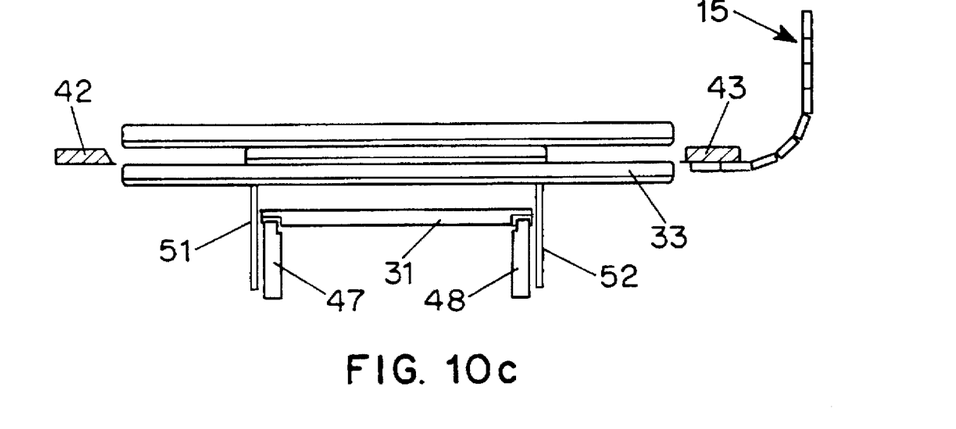

FIG. 10c shows that once cams 51, 52 have taken over the support of cassette 33 from the grippers 42, 43, the cassette can be opened, and the cams then pivoted into their intermediate position, in FIG. 5b, whereby the supported cassette is lowered over a height corresponding to the thickness of the casette.

Figure 10D:
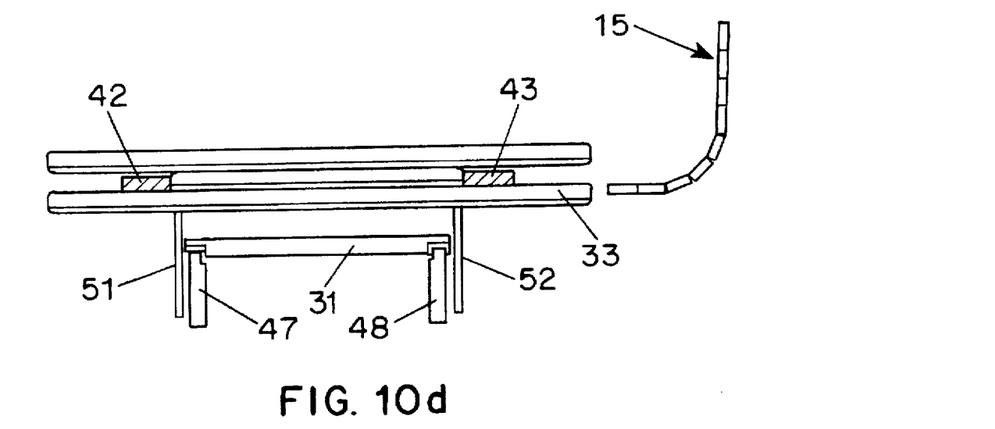

FIG. 10d shows that next grippers 42, 43 are closed whereby the next undermost cassette, and as a result the complete stack, becomes supported.

Figure 10E:
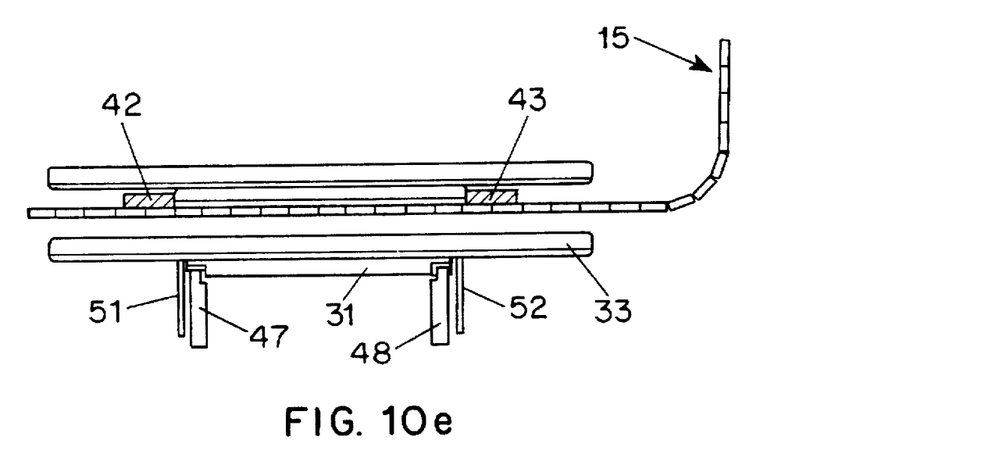
Figure 10F:
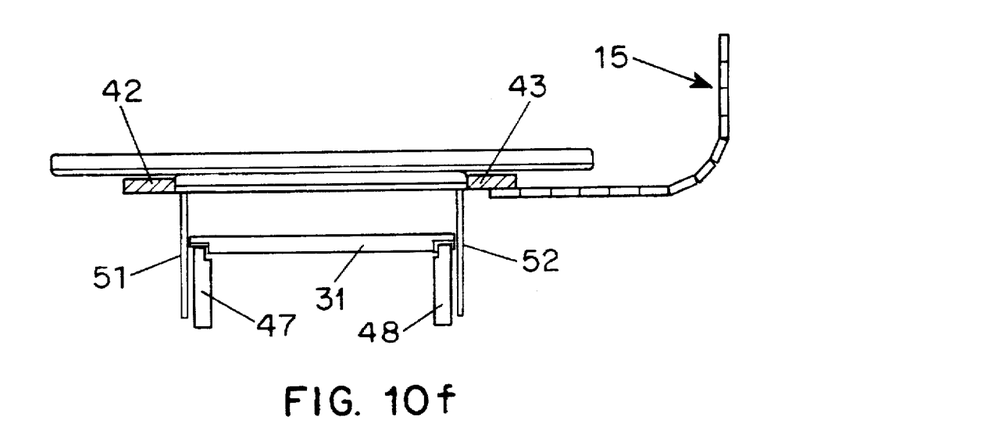

FIG. 10e shows that cams 51, 52 have been swung into their lowest position, see also FIG. 5c, whereby cassette 33 becomes disposed on carriage 31. This operation is also diagrammatically shown by the arrow in FIG. 6a. Roller shutter 15 is closed so that entry port 14 is lighttightly closed.

Figure 6B:
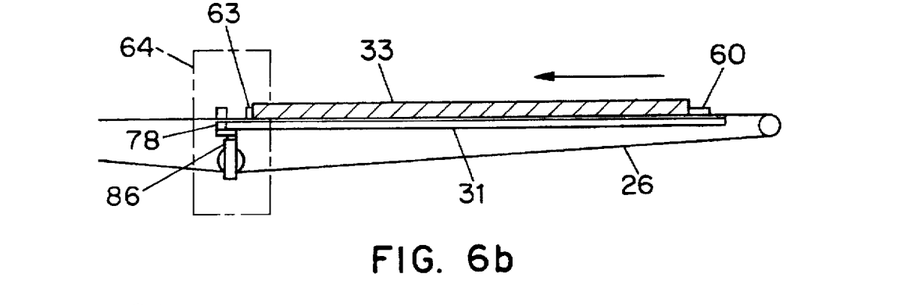
FIG. 6b is a diagrammatic view of the cassette transport mechanism in the cassette gripping position.

FIG. 6b shows that belt 26 is now rotated in forward direction so that its carrier 60 engages the rear end of cassette 33 and slides it forward over carriage 31 as shown by the arrow until the leading end of the cassette touches carrier 63 of the carriage. Up from that moment continued rotation of the belt causes the carriage to move forwardly, through the intermediary of the cassette. The carriage is further advanced over a small distance, e.g. between 1 and 2 cm, until it reaches the point where magnet 86 is no longer capable of attracting yoke 78 so that the coupling of the belt with the carriage is closed. The apparatus can be arranged in such a way that at this point the belt drive is temporarily arrested so that the cassette can be opened by lifting the cover from the bottom. This aspect is not included in the present invention and is not further described therefore.

Figure 6C:
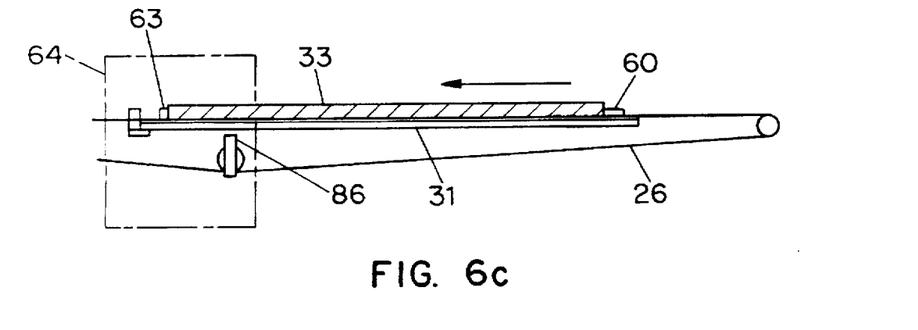
FIG. 6c is a diagrammatic view of the cassette transport mechanism, the belt being coupled with the carriage.

FIG. 6c shows the cassette movement during its passage through the scanning and erasing station. Since the cassette is firmly gripped between carriers 60 and 63 of the carriage and the belt, respectively, the belt is capable of advancing the cassette at a well controlled, uniform speed past said stations.

Figure 6D:
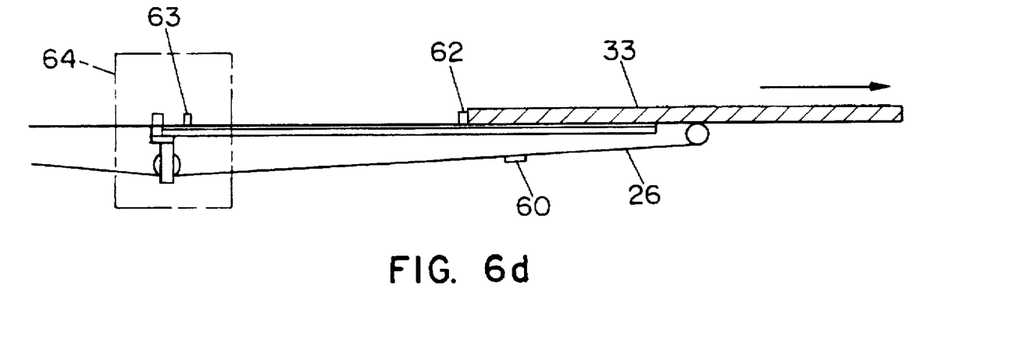
FIG. 6d is a diagrammatic view of the cassette transport mechanism during its returning movement.

FIG. 6d shows the withdrawal of the cassette from the apparatus after its scanning has been finished. The rotation of belt 26 is reversed so that the carriage is moved rearwardly until reaching the position where the lifted cover is kept. The rotation of the belt is briefly stopped, the cover put back onto the base, and next the rotation of the belt is resumed. As the coupling mechanism on the front side of the carriage enters within the reach of magnet 86, the coupling belt-carriage is opened whereby the carriage is no longer driven. Continued rotation of belt 26 causes carriers 62 to pass between the legs of the coupling bracket of the carriage which is at standstill and up from that moment the carriers engage the front side of the cassette and slide it rearwardly from the carriage until it finally is received on platform 16.

As the cassette has been taken away, the belt is rotated in forward direction until it takes a portion as shown in FIG. 6a whereafter a next cassette can be put on it.

Figure 6E:
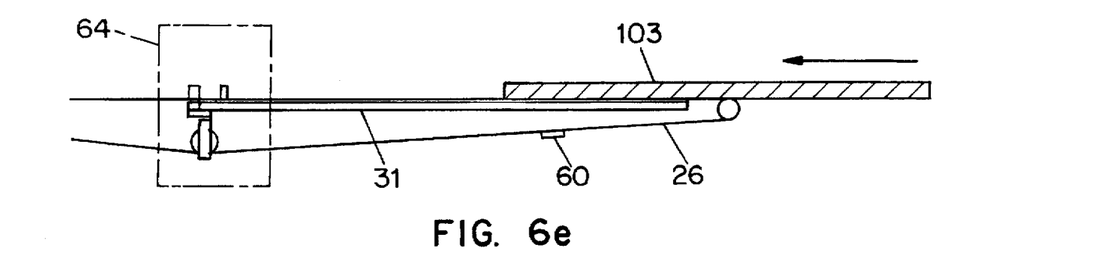
FIG. 6e is a diagrammatic view of the cassette transport mechanism by-passing the stacker mechanism.

FIG. 6e shows the situation in which the cassette removal mechanism described hereinbefore is by-passed in order to give priority to an urgency cassette 103. Such cassette is laid down on platform 16 and introduced through outlet port 17. Forward rotation of belt 26 causes the cassette to enter the apparatus by friction of the belt with the cassette. At a certain moment carrier 60 engages the rear end of the cassette and up from that moment cassette handling proceeds as described with reference to FIGS. 6b to 6d.

The present invention is not limited to the described embodiment. The coupling of the belt to the carriage can occur by other means than the described permanent magnet arrangement, and thus electromagnetic coupling or purely mechanical coupling by means of a lever actuated by suitable control means, can be used.

The carriage can have suitable openings or provisions for deriving identifying information from the cassette. For instance, the carriage can have contact fingers for contacting a contact board in the bottom wall of the cassette, connected with an EPROM loaded with cassette identification and exposure data.

Platform 16 can be replaced by a stacker mechanism for receiving scanned cassettes in succession.

The mechanism for removal of a cassette from a stack of cassettes as described hereinbefore forms the subject of our co-pending U.S. application Ser. No. 08/657,540 entitled "Scanning apparatus for PSL photography with a cassette stacker".

We claim:

1. Scanning apparatus with a scanning (18) and erasing (25) station for scanning and erasing a cassette of the type used in photo-stimulable luminescence ("PSL") radiography, which apparatus comprises a receiving station (13) for the receipt of a stack (35) of such cassettes and for removing the cassettes one by one from the stack and introducing said cassettes through an entry port (14) in said apparatus onto a transport for conveying said cassettes past said scanning and erasing station, wherein said transport comprises:

a scanning carriage (31) which has a rest position in which a cassette (33) which has been removed from the stack is deposited on said carriage, a carriage carrier (63) on a top surface of said carriage near a forward end thereof with respect to the direction of said transport conveyance toward said scanning and erasing station, an endless belt (26) which has an upper stretch running through a groove (46) disposed in said top surface of said carriage, said groove running parallel to the cassette conveying direction, belt carrier means (60) provided on said endless belt which is arranged for moving over said top surface of said carriage as said belt is rotated, coupling means (64) for coupling the upper stretch of said belt to said carriage, and control means for controlling the operation of said coupling means, and driving means (30) for reciprocally driving said belt (26) so that in the forward drive of said belt said cassette (33) which has been introduced on said carriage is pushed forward by contact of the rear edge of said cassette with said belt carrier means (60) and is slid forward over said carriage until the leading edge of said cassette engages said carriage carrier (63), and following such engagement continued rotation of said belt advances said carriage through the intermediary of said cassette, so as to convey said cassette past said scanning and erasing station, and that in the reverse drive of said belt the coupling of said belt to said carriage causes said carriage to move backward.

2. Scanning apparatus according to claim 1, wherein said belt carrier means (60) is arranged for moving over said top surface of said carriage as said belt is rotated.

3. Scanning apparatus according to claim 1, wherein said control means is arranged for coupling said belt (26) with said carriage (31) after said cassette has been gripped between said belt carrier means (60) and said carriage carrier (63).

4. Scanning apparatus according to claim 1, wherein said coupling means comprises two co-operating jaws (75, 84) provided on the forward end of said carriage, one jaw (75) being fixed to said carriage and the other jaw (84) being movable towards and away from said fixed jaw, and means (82, 83) urging both jaws together thereby clamping said belt passing between them.

5. Scanning apparatus according to claim 4, wherein said fixed jaw (75) is part of a bracket (70) mounted on the forward end of said carriage with respect to the direction of said transport conveyance toward said scanning and erasing station and extends transversely over said belt (26) running over said carriage, and said movable jaw (84) is located below said fixed jaw and spring biased thereto.

6. Scanning apparatus according to claim 4, wherein said control means comprises a ferromagnetic yoke (78) coupled with said movable jaw (84) and a permanent magnet (86) for attracting said yoke and opening thereby said movable jaw (84) as said yoke passes said magnet.

7. Scanning apparatus according to claim 1, wherein said (26) belt has a further carrier (62) for engaging the leading edge of said cassette during the reverse drive of said belt, after the coupling between said belt and said carriage has been broken and said carriage has come to rest, thereby enabling said belt to slide said cassette over said carriage and remove it from said apparatus.

8. Scanning apparatus according to claim 1, wherein said cassette (33) comprises a flat substantially rigid base plate (90) and a cap (91) for the base plate which is releasably securable to the base plate and lighttightly covers a layer of PSL material (93) applied to a face of the base plate.

* * * * *